United States Patent [19]

Satoh et al.

[11] 4,232,348
[45] Nov. 4, 1980

[54] TAPE END WARNING APPARATUS

[75] Inventors: Ken Satoh; Tuneo Yanagida, both of Hachioji, Japan

[73] Assignee: Olympus Optical Co., Ltd., Tokyo, Japan

[21] Appl. No.: 959,574

[22] Filed: Nov. 13, 1978

Related U.S. Application Data

[62] Division of Ser. No. 713,344, Aug. 11, 1976, Pat. No. 4,157,575.

[30] Foreign Application Priority Data

| Aug. 19, 1975 | [JP] | Japan | 50-113951 |
| Aug. 22, 1975 | [JP] | Japan | 50-115878 |
| Aug. 22, 1975 | [JP] | Japan | 50-115879 |
| Oct. 3, 1975 | [JP] | Japan | 50-135385 |
| Oct. 3, 1975 | [JP] | Japan | 50-135386 |
| Dec. 17, 1975 | [JP] | Japan | 50-168208 |

[51] Int. Cl.³ .................. G11B 15/06; G11B 23/30
[52] U.S. Cl. .................. 360/74.1; 360/67
[58] Field of Search .......... 360/137, 67, 74, 79, 360/90, 71; 340/259; 226/45

[56] References Cited

U.S. PATENT DOCUMENTS

| 3,497,635 | 2/1970 | Schneider | 360/74.7 |
| 3,660,810 | 5/1972 | Yoshii | 360/137 X |
| 3,699,670 | 10/1972 | Takeda | 360/74.4 |
| 3,820,101 | 6/1974 | Bolick, Jr. | 340/259 |
| 4,003,093 | 1/1977 | Satoh | 360/137 |
| 4,005,486 | 1/1977 | Satoh | 360/79 |

*Primary Examiner*—John H. Wolff
*Attorney, Agent, or Firm*—Ostrolenk, Faber, Gerb & Soffen

[57] ABSTRACT

A tape end warning apparatus comprises an alarm switch which is closed in response to the detection of a terminal end of a running tape being reached during a record or playback operation of a tape recorder, and an oscillator circuit which is activated by the closure of the switch. The oscillator circuit produces an alarm signal which is fed to an amplifier inherently contained in a tape recorder so as to give off an audible alarm through a loudspeaker which is connected with the amplifier.

8 Claims, 16 Drawing Figures

F I G. 3
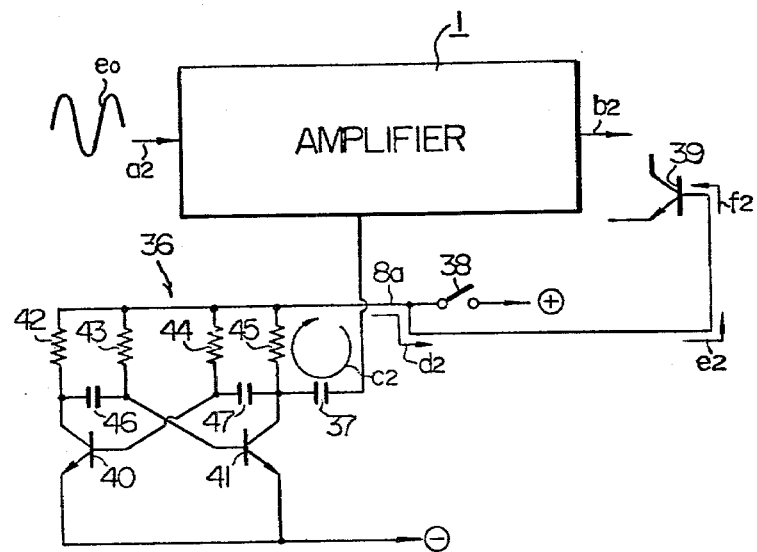
F I G. 4
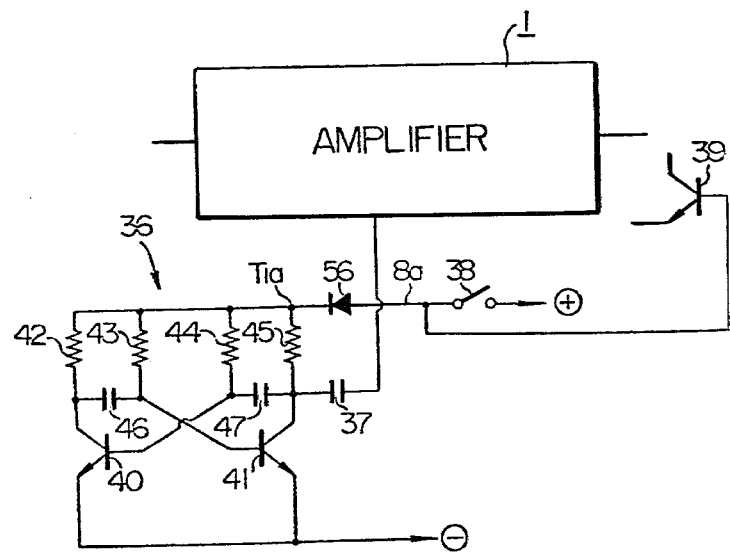

TAPE END WARNING APPARATUS

RELATED APPLICATIONS

This is a divisional of U.S. patent application Ser. No. 713,344, filed Aug. 11, 1976 now U.S. Pat. No. 4,157,575.

BACKGROUND OF THE INVENTION

The invention relates to a tape end warning apparatus for indicating the end of a running tape in a tape recorder.

A variety of devices are heretofore available which indicate to the operator of a tape recorder that a terminal end of a running magnetic tape is reached during a record or playback operation. By way of illustration, an electrically conductive foil may be applied to the terminal end of the tape so as to be detected for activating an alarm buzzer; or the mechanical tension in the tape may be utilized to detect that the terminal end of the tape is reached, thereby operating a mechanical stop assembly to interrupt the operation of a tape drive motor in an automatic manner. However, these prior arrangements add to the complexity of the tape recorder into which they are incorporated, and additionally requires a relatively large space for their provision. Thus, their provision stands in the way to the miniaturization of the tape recorder. Since a miniature size tape recorder which employs a micro-cassette has a limited internal space which cannot afford to the provision of a mechanical stop mechanism and since the tape cassette is of a size which prohibits further apparatus from being applied to a magnetic tape disposed therein, the known arrangements are completely unusable with such a miniature size tape recorder. Nevertheless, it is desirable that some means be provided to indicate to the operator that a terminal end of a running tape contained in a micro-cassette is reached. The desirability will be appreciated if one considers a recording of some information with the tape recorder, where it will be noted that the operator may continue to run the recorder without noticing the fact that the tape end is reached and there is no longer any available length of tape on which to record the information, thus resulting in a serious failure to record the information. However, there has been no available arrangement end being reached in a tape recorder which cannot afford to the provision of any additional mechanism in the interior thereof.

SUMMARY OF THE INVENTION

It is an object of the invention to provide a tape end warning apparatus for use in a tape recorder which eliminates the above disadvantages by giving an audible alarm indicative of the end of the tape running through an amplifier and a loudspeaker which are inherently provided in the tape recorder.

In a first embodiment of the invention (see FIGS. 1 to 11 and 16), there is provided a tape end warning apparatus utilizing an audio amplifier and a loudspeaker inherently provided in the tape recorder which are connected with an audible alarm generator through an alarm switch which is closed when the tape end is detected. Because the amplifier and the loudspeaker are inherently provided in the tape recorder, there is no additional space requirement, thus enabling it to be incorporated into a miniature size tape recorder.

In a second embodiment of the invention (see FIGS. 12 to 15), there is provided a tape end warning apparatus which utilizes an amplifier and a loudspeaker inherently provided in a tape recorder and which additionally includes an alarm switch, adapted to be operated in response to the detection of a tape end, and a switching transistor, the arrangement being such that when a running tape reaches its terminal end, the switch is closed to render the transistor conductive, whereupon the amplifier has its output terminal forcibly connected with the loudspeaker even during a record operation. Simultaneously, a positive feedback is applied to the amplifier to cause it to oscillate, and the oscillation is applied to the loudspeaker, which therefore gives off an audible alarm indicative of the tape end. It should be noted that a separate oscillator need not be provided to produce the audible alarm.

Further details, features and advantages of the invention will become apparent from the following description of embodiments thereof illustrated in the drawings.

BRIEF DESCRIPTION OF THE DRAWINGS

FIG. 3 is a circuit diagram which illustrates the manner of a malfunctioning which may occur in the apparatus shown in FIG. 1;

FIG. 4 is a circuit diagram of means for preventing the malfunctioning illustrated in FIG. 3;

DETAILED DESCRIPTION OF PREFERRED EMBODIMENTS

Figure 1:
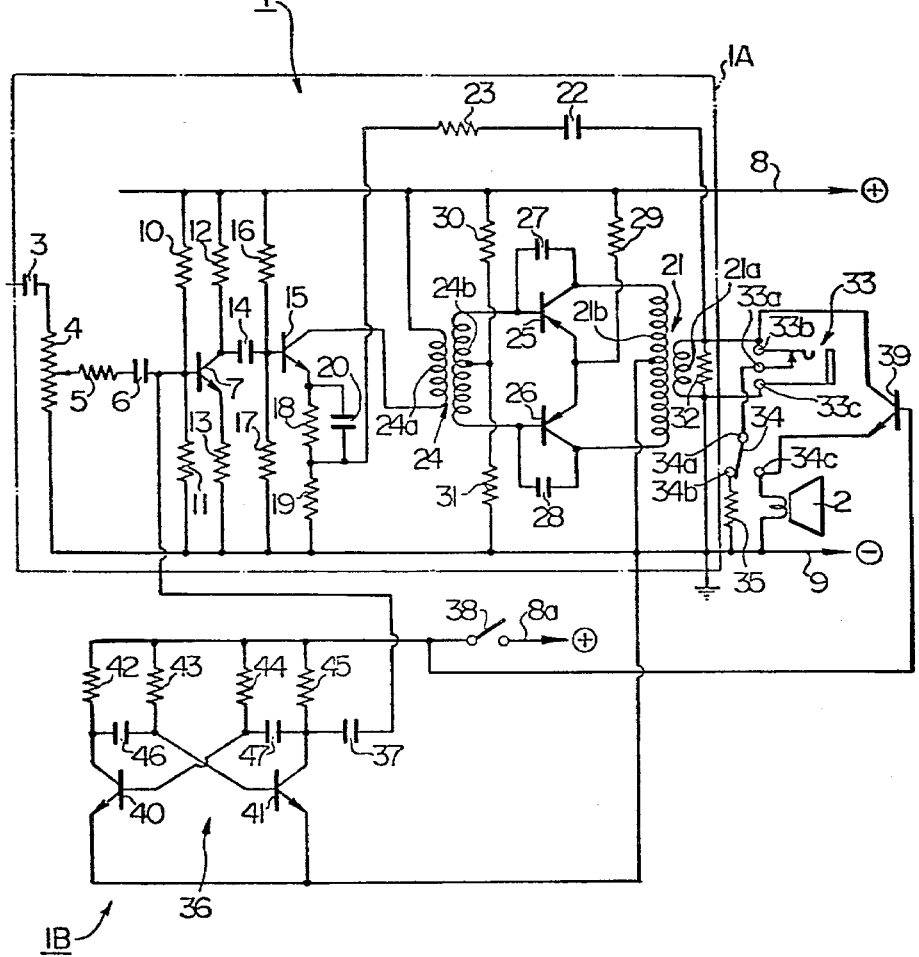
FIG. 1 is a circuit diagram of a tape end warning apparatus constructed in accordance with one embodiment of the invention.

Initially, an apparatus of the invention will be described which has an oscillator circuit formed separately from an audio amplifier inherently provided in a tape recorder. Referring to FIG. 1, the tape recorder shown includes an amplifier 1, shown in a block indicated by phantom lines 1A. The amplifier 1 functions to amplify a reproduced output signal from a playback head, not shown, and feed it to a loudspeaker 2 when the tape recorder is in its playback mode, and to amplify an output signal from a microphone, not shown, and feed it to a record head, not shown, when the tape recorder is in its record mode.

The circuit arrangement of the amplifier 1 is conventional. However, briefly describing the amplifier circuit, an output signal from a playback head or a microphone is applied through a coupling capacitor 3 to a variable resistor 4 which represents a volume control. From the variable resistor 4, the output signal is passed through a series combination of a resistor 5 and a capacitor 6 to be applied to the base of a first amplifying transistor 7, which base is applied with an operative voltage by a voltage divider formed by a pair of resistors 10, 11 connected in series across a positive and a negative bus 8, 9 of a power source. The collector of the transistor is connected through a resistor 12 with the bus 8 while the emitter is connected through a resistor 13 to the bus 9. The amplified output from the transistor 7 is applied through a coupling capacitor 14 to the base of a second amplifying transistor 15, which base is supplied with an operating voltage by a voltage divider comprising a pair of series resistors 16, 17 which are connected in a manner similar to the resistors 10, 11. The emitter of the transistor 15 is connected with the negative bus 9 through a series circuit comprising a pair of resistors 18, 19, the resistor 18 being shunted by a capacitor 20. The junction between the resistors 18, 19 is connected through a series circuit comprising a resistor 23 and a capacitor 22 with a secondary coil 21a of an output transformer 21, thereby providing a negative feedback. The collector of the transistor 15 is connected with the positive bus 8 through a primary coil 24a of a coupling transformer 24.

The final stage of the amplifier 1 comprises a push-pull amplifier circuit which is coupled with the transistor 15 through the coupling 24. The push-pull circuit comprises a pair of transistors 25, 26 having their base electrodes connected with the opposite ends of a center tapped secondary winding 24b of the transformer and having their emitter electrodes connected in common and with the positive bus 8 through a resistor 29, with a pair of capacitors 27, 28 connected across the collector and base of the respective transistors. The center tap of the secondary winding 24b is connected with the junction between a pair of resistors 30, 31 connected across the positive and negative buses and forming a voltage divider. The collector electrodes of the transistors 25, 26 are connected with the opposite ends of a center tapped primary coil 21b of output transformer 21, with the center tap being connected with the negative bus 9. A protective resistor 32 is connected across the secondary coil 21a of the output transformer 21.

The opposite ends of the secondary coil 21a are connected with an earphone jack 33, which comprises a movable contact 33a, and a pair of stationary contacts 33b and 33c which are connected with the ends of the coil 21a. Normally, the movable contact 33a is thrown to the stationary contact 33b. The stationary contact 33c is connected with the negative bus 9, which may be connected with the ground. The movable contact 33a is also connected with a movable contact 34a of a record/playback changeover switch 34 which also includes a pair of stationary contacts 34b and 34c. In the record mode of the tape recorder, the movable contact is thrown to the stationary contact 34b, as shown, while in the playback mode, the movable contact is thrown to the other stationary contact 34c. The stationary contact 34b is connected with the negative bus 9 through a resistor 35 while the stationary contact 34c is connected with a moving coil of the loudspeaker 2.

A tape end warning apparatus according to the invention is generally shown at 1B and comprises an audio frequency oscillator 36, a coupling capacitor 37 which feeds the output signal of the oscillator 36 to the input end of the amplifier 1, an alarm switch 38 adapted to be closed when a terminal end of a running tape Tp (see FIG. 2) is reached, and a switching transistor 39 responsive to the closure of the switch 38 for connecting the output from the amplifier 1 to the loudspeaker 2. The switch 38 and the transistor 29 together from the alarm switch means.

In the embodiment shown, the oscillator 36 comprises a flipflop circuit formed by a multivibrator oscillator of a known form. The flipflop comprises a pair of transistors 40, 41 having their collectors connected with a positive bus 8a through resistors 42, 45, respectively, and having their base connected with the positive bus 8 through resistors 44, 43, respectively, and also connected with the collector of the other transistor through capacitors 46, 47, respectively. The coupling capacitor 37 has its one end connected with the collector of the transistor 41 and its other end connected with the base of the input transistor 7 of the amplifier 1, thus serving to apply an output signal from the oscillator 36 to the amplifier 1.

Figure 2:
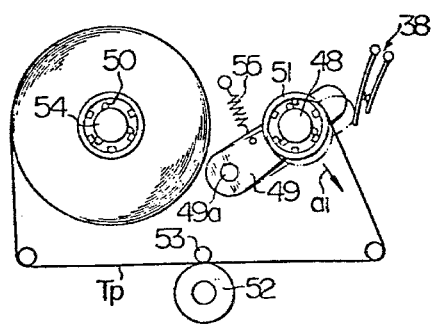
FIG. 2 is a plan view of a mechanism which operates an alarm switch.

The alarm switch 38 is connected with a positive power source, not shown, which feeds the oscillator 36, and is normally open. As indicated in FIG. 2, the switch 38 may be disposed in the path of rocking motion of a movable member 49 which supports a supply shaft 48 for a running tape Tp. When the running tape Tp reaches its terminal end, a resulting increase in the tension of the tape acts through the shaft 48 to rock the movable member 49 in a direction to close the switch 38. As is well known, a magnetic tape has its opposite ends anchored to a pair of tape hubs 50, 51, and is fed by the cooperation between a pinch roller 52 and a capstan 53. When the running tape Tp is entirely taken up on a tape take-up shaft 54 and thus reaches its terminal end, the winding force produces an increase in the tape tension, whereupon the movable member 49, pivotally mounted on a pin 49a, rocks in the direction of an arrow $a_1$ against the resilience of a spring 55 which normally maintains the tape supply shaft 48 in its home position, thus closing the switch 38.

As shown in FIG. 1, the switching transistor 39 has its base connected with the junction between the switch 38 and the resistors 42 to 45, and has its collector connected with the stationary contact 33b of the earphone jack 33. The emitter of the transistor 39 is connected with the stationary contact 34c of the changeover switch 34. When the switch 38 is closed, an operating voltage is applied to the base of transistor 39 to render it conductive.

In operation, in either a record or playback condition of the tape recorder, as a terminal end of the running tape Tp is reached, the resulting increase in the tape tension causes the movable member 49 to rock, thus closing the alarm switch 38. Thereupon, the oscillator 36 and the transistor 39 are fed from the positive bus 8a, whereby the oscillator 36 begins to oscillate, with its output signal of an audio frequency being coupled through the capacitor 37 to the base of the transistor 7 which is contained in the amplifier 1. As a result, the output signal is amplified by the amplifier 1 and appears across the secondary coil 21a of the output transformer 21. Since the transistor 39 is rendered conductive, the loudspeaker 2 is connected across the secondary coil 21a, so that the output signal of an audio frequency appearing across the secondary coil 21a is converted by the loudspeaker 2 into an audible alarm, indicating that a terminal end of the running tape Tp is reached.

Referring to FIG. 3, when an input signal $e_0$ applied to the input terminal of the amplifier 1 has a sufficient amplitude to render the transistor 39 conductive, it passes through paths a2, b2, c2, d2, e2 and f2, and thus is applied to the base of the transistor 39 through the coupling capacitor 37, resistor 45 of the oscillator 36 and part of the bus 8a. This results in a conduction of the transistor 39, supplying the signal which is to be applied to a record head, to the loudspeaker 2, preventing an intended recording operation.

In order to avoid the occurrence of such inconveniences FIG. 4 shows the connection of a diode 56 in the portion of the bus 8a located between the oscillator 36 and the switch 38, the diode being poled to prevent a flow of signal through the bus portion located between the switch 38 and a point T1a of the oscillator 36. It will be appreciated that this prevents the input signal $e_0$ from being applied the base of the switching transistor 39.

As will be made apparent from the foregoing description, the tape end warning apparatus of the present embodiment allows the loudspeaker 2 to give off the audible alarm indicative of the terminal end of the running tape even during a record mode of the tape recorder, since the loudspeaker 2 is connected with the output terminal of the amplifier 1 through the switched transistor 39. However, under certain circumstances where the fact of maintaining the tape recorder in a record mode should be kept in secret, the production of the audible alarm by the loudspeaker 2 is undesirable. Generally, such a secret recording is performed by monitoring the record by an earphone, not shown, which is inserted into the jack 33 of the tape recorder. Hence, it will be convenient to produce the audible alarm through the earphone. Though the desired result can be achieved by the addition of a switch or the like, this requires an increase in the number of parts and an additional space requirement. This can be avoided by a modification of the electrical interconnection between the jack 33 and the transistor 39, without requiring additional parts and increasing the space requirement therefor.

Figure 5:
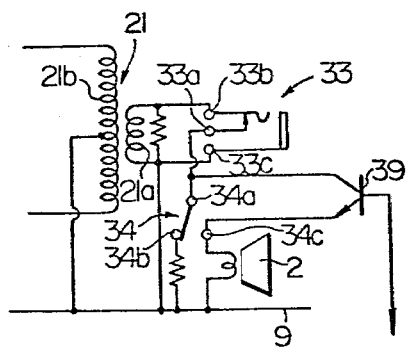
FIG. 5 is a circuit diagram of means for preventing an audible alarm from being given off by a loudspeaker when an earphone is being used.

The collector of the switching transistor 39 is connected with the stationary contact 33b of the jack 33 in the circuit arrangement shown in FIG. 1. However, it may be connected with the movable contact 33a of the jack 33, as shown in FIG. 5. With this modification in the connection of the collector of the transistor 39, so long as an earphone is inserted into the jack 33, the loudspeaker 2 remains disconnected from the secondary coil 21a of the output transformer 21 even if the transistor 39 is rendered conductive, and therefore cannot give off the audible alarm. Instead the earphone (not shown) which is inserted into the jack 33 will be connected across the coil 21a to provide a reproduction of the audible alarm. The reproduction of the audible alarm from the loudspeaker 2 may also be prevented by the insertion of a plug (not shown) which is similar to the earphone jack but which is not connected with any earphone. It should be understood that during a normal recording other than a secret recording, and thus when no earphone is inserted into the jack 33, the loudspeaker 2 can give off the audible alarm.

It should be understood that the audio frequency oscillator 36 is not limited to the flipflop circuit shown, but may be of any design capable of producing an output signal of an audio frequency. Similarly, the alarm switch 38 may be closed by other means than that shown, the only requirement being that the switch be closed by detecting the fact that the running tape has reached its terminal end.

Figure 6:
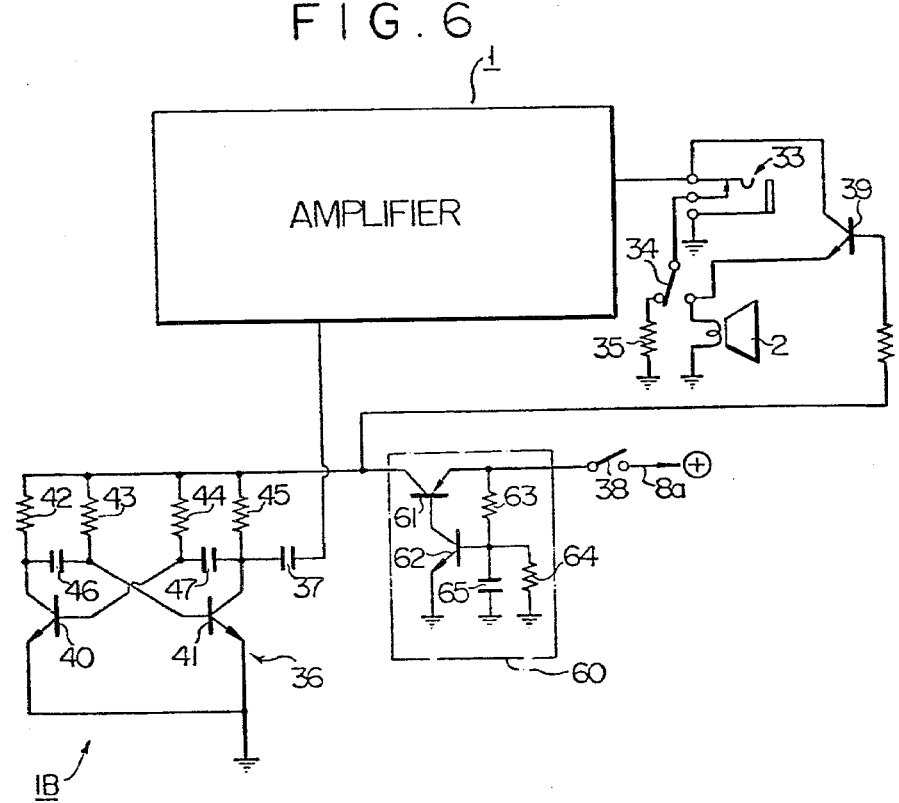
FIG. 6 is a circuit diagram of means for preventing an audible alarm from being generated as by closure of the alarm switch in response to the vibrations.

Referring to FIG. 6, there is shown another embodiment which prevents the generation of the audible alarm in response to a momentary closure of the alarm switch which may be caused by an extraneous factor such as vibrations of the tape recorder during a portable use thereof, when the running tape does not reach its terminal end. The circuit arrangement is generally similar to that shown in FIG. 1 except that a delay circuit 60 is connected in the circuit path between the switch 38 and the oscillator 36. The delay circuit 60 comprises a pair of transistors 61, 62, resistors 63, 64 and a capacitor 65. The emitter of the transistor 61 is connected with one terminal of the switch 38 and its collector is connected with the oscillator 36 of the warning apparatus 1B as well as the switching transistor 39. The base of the transistor 61 is connected with the collector of the other transistor 62, the emitter of which is connected with the ground, and the resistor 63 is connected across the emitter of the transistor 61 and the base of the transistor 62. The capacitor 65 is connected in series with the resistor 63, and thus forms a time constant circuit which determines the delay time of the circuit 60. The capacitor 65 is shunted by the discharge resistor 64.

In operation, assuming that the alarm switch 38 is momentarily closed as by oscillations during the tape running, the bus 8a feeds current which charges the capacitor 65 through the resistor 63. During the time the capacitor 65 is being charged, the transistors 61 and 62 cannot conduct, and therefore the warning apparatus 1B cannot operate. Hence, if the switch 38 which is momentarily closed re-opens within such delay time, the warning apparatus remains inoperative, and hence an inadvertent closure of the alarm switch 38 in response to oscillations to oscillations cannot produce a false warning indicative of tape end. When the switch 38 re-opens, the capacitor 65 is discharged through the resistor 64.

When the running tape has reached its terminal end, the alarm switch 38 is closed as before, so that the transistors 61, 62 conduct after a time delay determined by the resistor 63 and the capacitor 65. Thus the bus 8a is connected with the warning apparatus 1B through the alarm switch 38 and the delay circuit 60, thus operating it to warn the operator of the fact that a terminal end of the running tape has been reached.

Figure 7:
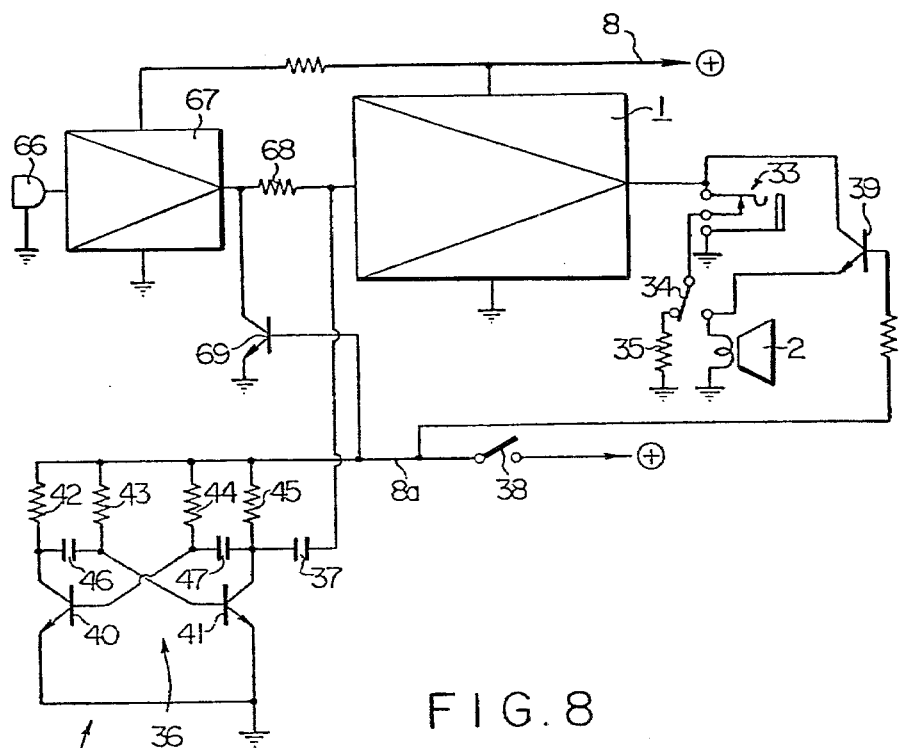
FIG. 7 is a circuit diagram of means which prevents a howling.

FIG. 7 shows a further embodiment in which a howling of a microphone is prevented by connecting the microphone to the ground through an active element which operates upon the generation of an audible alarm. The circuit arrangement shown in FIG. 7 is generally similar to that shown in FIG. 1 except that a record amplifier 67 is connected to feed a signal from a microphone 66 connected to its input, through a coupling resistor 68 to the coupling capacitor 3 (see FIG. 1) at the input terminal of the amplifier 1. As shown, the amplifier 67 is fed from the bus 8. The signal amplified by the amplifier 1 is supplied to a record head, not shown. In addition, the circuit arrangement shown in FIG. 7 includes an active element or a variable impedance element in the form of a transistor 69. The collector of the transistor 69 is connected with the output terminal of the amplifier 67, and its emitter is connected with the ground or the negative bus 9. The base of the transistor 69 is connected with the junction between the switch 38 and the oscillator 36.

During a record mode of the tape recorder, as the running tape reaches its terminal end, the closure of the switch causes the tape end warning apparatus to operate, thereby indicating the terminal end of the tape through the audible alarm. In addition, the closure of the switch 38 permits a sufficient bias to be applied to the base of the transistor 69 to render it conductive. Thereupon, the output terminal of the record amplifier 67 is short-circuited to the ground and thus is prevented from being an input to the amplifier 1, which only receives the oscillation output from the oscillator 36. In this manner, a howling is effectively avoided while allowing the audible alarm to be given off by the loudspeaker 2.

Instead of short-circuiting the output terminal of the amplifier 67 to the ground, the output terminal of the microphone 66 may be directly short-circuited to the ground by similar means. As a further alternative, the power connection of the amplifier 67 with the bus 8 may be interrupted by corresponding means.

Figure 8:
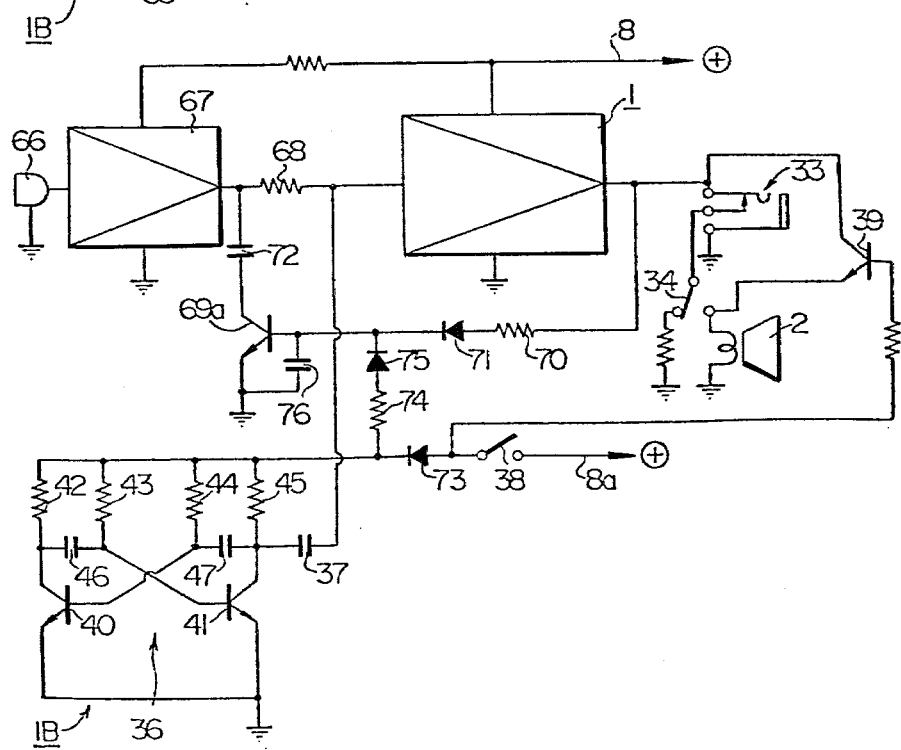
FIG. 8 is a circuit diagram of another means which prevents a howling effect.

FIG. 8 shows a modification of the circuit arrangement shown in FIG. 7 in that a transistor which is provided in the amplifier circuit for the purpose of AGC (automatic gain control) is utilized to prevent a howling when producing an audible alarm. In FIG. 8, during a record mode of the tape recorder, an output from the microphone 66 which is to be recorded is amplified by the record amplifier 67 and then applied through the coupling resistor 68 to the coupling capacitor 3 (see FIG. 1) at the input terminal of the amplifier 1. Subsequently, the amplified output from the amplifier 1 is supplied to a record head, not shown. An AGC circuit comprising a resistor 70, a diode 71, a variable impedance element in the form of a transistor 69a and a capacitor 72 is connected across the output terminal of the amplifier 1 and the output terminal of the record amplifier 67 to apply an AGC action, which maintains a constant optimum level at the output of the amplifier 1. The transistor 69a has its collector connected with the output terminal of the amplifier 67 through the capacitor 72, its emitter connected to the ground and its base connected with the output terminal of the amplifier 1 through the series combination of the diode 71 and resistor 70.

The AGC transistor 69a is effectively utilized for the purpose of the invention. A diode 73 is connected between the switch 38 and the oscillator 36 and is poled to prevent a current flow from the oscillator to the switch. A series circuit comprising a resistor 74 and a diode 75 is connected between the base of the transistor 69a and the cathode of the diode 73, and a capacitor 76 is connected across the base and emitter of the transistor 69a.

With this embodiment, while a sufficient length of tape is available during a record operation of the tape recorder, the transistor 69a responds to the output signal of the amplifier 1 by applying an AGC action. However, when the running tape reaches its terminal end, the closure of the switch 38 activates the tape end warning apparatus for giving off an audible alarm. The closure of the switch 38 causes the capacitor 76 to be charged through a path including the diode 73, resistor 74 and diode 75, whereby an operating voltage is applied to the base of the transistor 69a to render and maintain it conductive. As it conducts, the amplification factor of the record amplifier 67 is substantially attenuated, thus preventing a howling effect as a result of an input signal to the microphone 66. The alarm output from the oscillator 36 is applied to the input of the amplifier 1 in a normal manner, thereby causing the loudspeaker 2 to give off an audible alarm.

Figure 9:
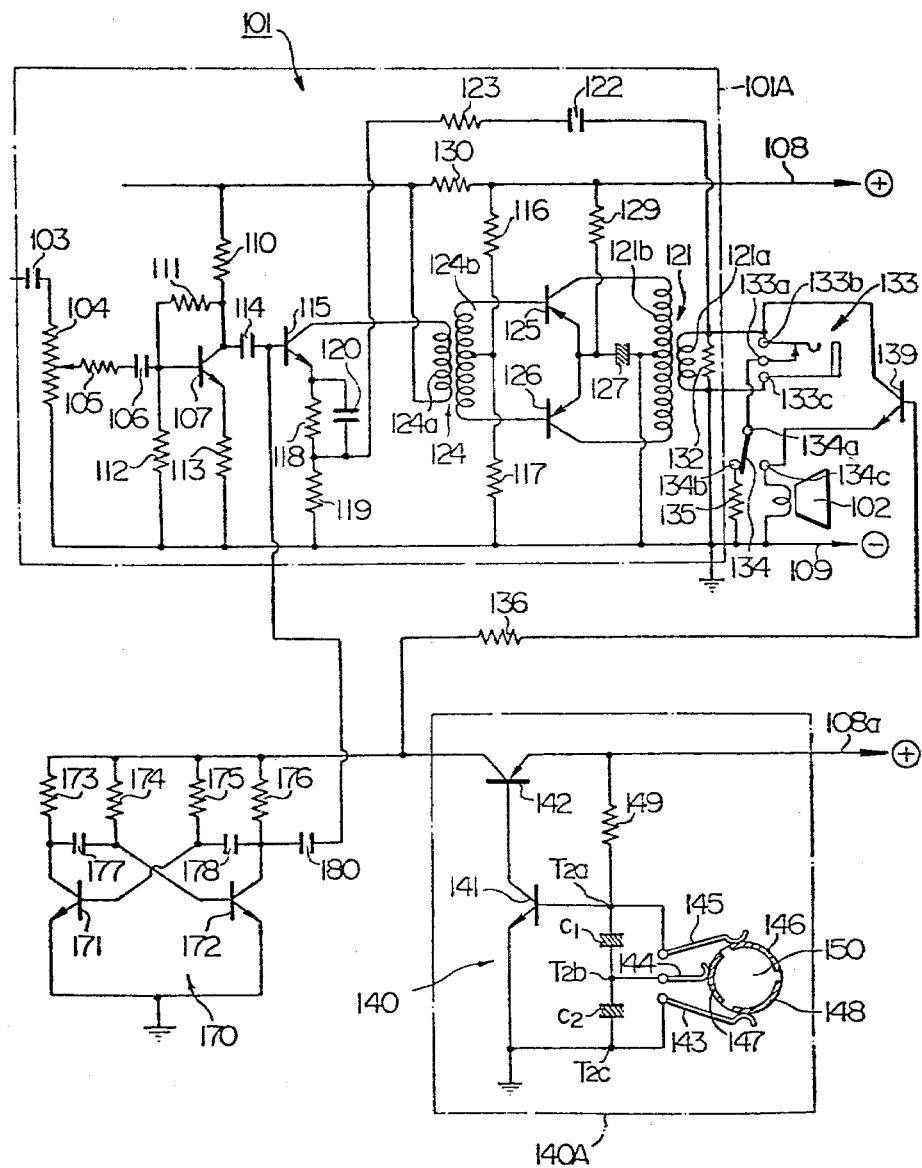
FIG. 9 is a circuit diagram of a tape end warning apparatus which incorporates a tape end detector comprising a capacitor.
Figure 10:
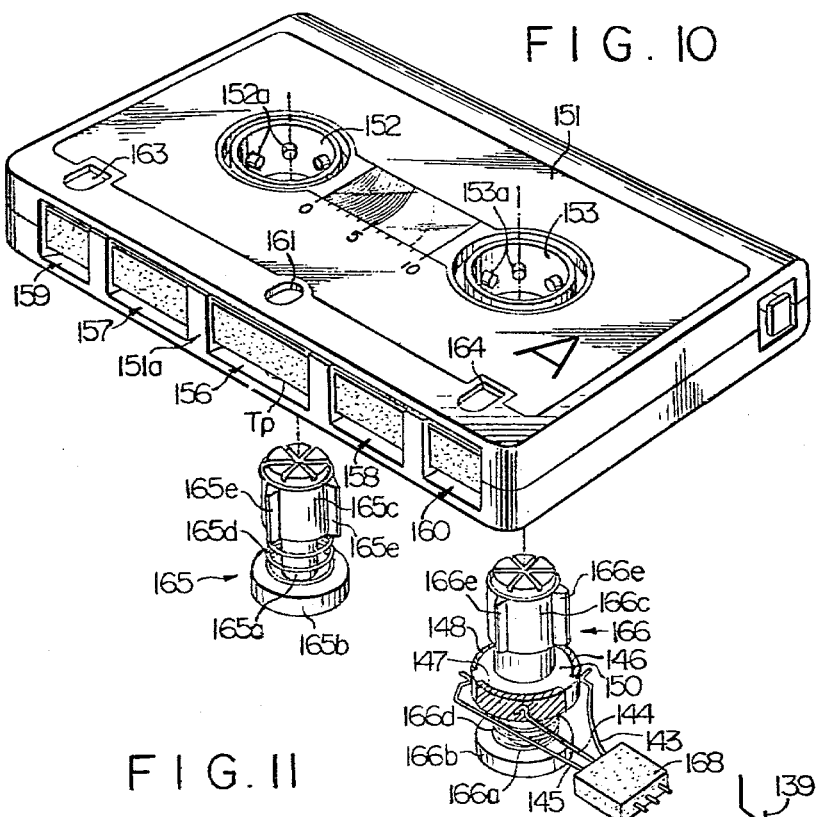
FIG. 10 is a perspective view of a micro-cassette, illustrating a mechanism for providing a sliding contact between a resilient sliding contact and a movable contact.

Referring to FIGS. 9 and 10, another form of tape end warning apparatus will be described below in which a switching transistor is rendered conductive to operate an audio frequency oscillator to thereby supply its oscillation output to the amplifier contained in the tape recorder so as to be given off by the loudspeaker thereof, by electrically detecting the interruption of rotation of a tape supply shaft and a tape take-up shaft which occurs when the running tape reaches its terminal end. In FIG. 9, an amplifier 101 of the tape recorder is shown in a block 101A indicated by phantom lines. The amplifier 101 is operative, during a playback mode of the amplifier, to amplify an output signal reproduced by a playback head, not shown, and supply it to a loudspeaker 102, and is operative, during a record mode of the tape recorder, to amplify an output signal from a microphone, not shown, and supply it to a record head, not shown.

The amplifier 101 is conventional as was the amplifier 1 mentioned above. The output signal from either a playback head or microphone is coupled through the coupling capacitor 103 to be applied across an adjustable resistor 104 which represents a volume control. An adjusted output signal from the adjustable resistor 104 is fed through a series combination of a resistor 105 and a capacitor 106 to the base of a first amplifying transistor 107. An operating voltage is applied to the base by a voltage divider formed by a series of resisters 110, 111, 112 connected across a positive supply bus 108 and a negative supply bus 109, the junction between the resistors 111 and 112 being connected with the base. The transistor 107 has its collector connected with the junction between the resistors 110, 111, and has its emitter connected with the bus 109 through a resistor 113. The amplified signal from the transistor 107 is fed through a coupling capacitor 114 to the base of a second amplifying transistor 115, the emitter of which is connected with the bus 109 through a series circuit of resistors 118, 119. The resistor 118 is shunted by a capacitor 120, and the junction between the resistors 118,119 is connected through a series combination of a resistor 123 and a capacitor 122 with the secondary coil 121a of an output transformer 121, thus providing a negative feedback. The collector of the transistor 115 is connected with the bus 108 through the primary coil 124a of a coupling transformer 124.

The final stage of the amplifier 101 is formed by a push-pull amplifier circuit which is coupled with the transistor 115 through the coupling transformer 124. The transformer 124 has a secondary coil 124b, the opposite ends of which are connected with the base of a pair of transistors 125, 126 having their emitters connected in common and with the bus 108 through a resistor 129. The secondary coil 124b has a center tap which is connected with the respective buses through a pair of resistors 116, 117. The collectors of the transistors 125, 126 are connected with the opposite ends of a center tapped, primary coil 121b of an output transformer 121, with the center tap being connected with the negative bus 109. In addition, a capacitor 127 is connected between the center tap and the emitter of the respective transistors 125, 126. The final stage induces an amplified output signal across the secondary coil 121a, across which is connected a protective resistor 132. It is to be noted that a voltage regulation resistor 130 is connected in the bus 108.

An earphone jack 133 is connected across the secondary coil 121a. As is conventional, the jack 133 includes a movable contact 133a and a pair of stationary contacts 133b, 133c which are connected across the secondary coil. The movable contact 133a is normally maintained in contact with the stationary contact 133b. The stationary contact 133c is also connected with the negative bus 109. The movable contact 133a is connected with a movable contact 134a of a record/playback changeover switch 134 having a pair of stationary contacts 134b, 134c. During a record mode of the tape recorder, the movable contact 134a is thrown to the stationary contact 134b, while during a playback mode, it is thrown to the other stationary contact 134c. A resistor 135 is connected between the stationary contact 134b and the bus 109, and a loudspeaker 102 is connected between the stationary contact 134c and the bus 109.

In accordance with the invention, a transistor 139 has its base connected through a resistor 136 with a tape end detector circuit 140. The collector of the transistor 139 is connected with the stationary contact 133b of the earphone jack 133, while the emitter is connected with the other stationary contact 134c of the changeover switch 134. The arrangement is such that an operating voltage is supplied to the base of the transistor 139 from the tape end detector circuit 140.

The tape end detector circuit 140 is shown in a block indicated by phantom lines 140A, and comprises a series circuit including at least two capacitors C1, C2; a first and a second switching transistor 141, 142 which are rendered conductive when the capacitors C1, C2 are charged to given voltages; and three contact fingers 143, 144, 145 slidably engaging the contact segments 146, 147, 148 for controlling the charging of the copacitors C1, C2. More specifically, the base of the transistor 139 is connected with the collector of the second switching transistor 142, which has its emitter connected with the positive bus 108. The base of the transistor 142 is connected with the collector of the first switching transistor 141, which has its emitter connected with the ground. The capacitor C1 has one end connected through a resistor 149 with the positive bus 108 and the other capacitor C2 has its end remote from the capacitor C1 connected with the ground. The junction T2a between the capacitor C1 and the resistor 149 is connected with the base of the transistor 141. The junction T2a is also connected with the contact finger 145 while the contact finger 144 is connected with the junction T2b between the capacitors C1 and C2 and the contact finger 143 is connected with the other end T2c of the capacitor C2 which is connected with the ground.

The contact segments 146 to 148 which are slidably engaged by the contact fingers 143 to 145 are mounted on a support ring 150 (see FIG. 10) which is mounted on one of the tape hubs for integral rotation therewith. Referring to FIG. 10, there is shown a tape cassette 151 which is of the type commonly referred to as a microcassette. The cassette 151 has a pair of tape hubs 152, 153 rotatably disposed therein, and a length of a magnetic tape Tp has its opposite ends secured on the respective hubs and is disposed thereon. A leader portion of the tape Tp is drawn from the periphery of one hub 152, passed around guide rollers, not shown, so as to be disposed in a taut condition along window slots 156, 157, 158, 159 and 160 formed in the front end face 151a of the cassette 151. Specifically, the centrally located slot 156 is adapted to receive a pinch roller, and the immediately adjacent slots 157 and 158 are adapted to receive a record/playback head. And the outermost slots 159, 160 are adapted to receive an erase head.

An aperture 161 for receiving a capstan is formed to extend through the cassette 151 vertically at a position immediately behind the central slot 156, the capstan being adapted to feed the tape Tp at a rated speed. A pair of cassette positioning apertures 163, 164 are also formed to extend through the cassette vertically at positions immediately behind the slots 159, 160. As shown, the tape hubs 152, 153 are formed with a plurality of inwardly extending projections 152a, 153a which are adapted for engagement between outwardly extending projections from a tape supply shaft and a tape take-up shaft provided on the part of the tape recorder when the cassette 151 loaded thereon.

Specifically, the tape recorder is provided with a tape supply shaft 165 and a tape take-up shaft 166 which are adapted to fit in the tape hubs 152 and 153, respectively. The tape supply shaft 165 comprises a drive shaft 165a which is rotatably mounted, a drive wheel 165b which is integrally secured to the lower portion of the shaft 165a, a drive sleeve 165c rotatably fitted on the shaft 165a, and a tension transmission spring 165d disposed on the shaft 165a intermediate the sleeve and the drive wheel 165b. A rotating drive is imparted from a drive mechanism, not shown, to the drive wheel 165b for rotating the drive sleeve 165c through the spring 165d. The drive sleeve 165c is provided with outwardly extending projections 165e which engage between the projections 152a. The tape take-up shaft 166 is constructed in the similar manner. Specifically, it comprises a drive shaft 166a which is rotatably mounted, a drive wheel 166b integrally secured to the lower portion of the shaft 166a, a drive sleeve 166c which is fitted over the top portion of the shaft 166a and capable of relative rotation thereto, a plurality of outwardly extending projections 166c formed on the periphery of the sleeve 166c and adapted for engagement between the projections 153a on the hub 153, and a tension transmission spring 166d disposed on the shaft 166a at a position above the drive wheel 166b.

The support ring 150 mentioned above is formed of an electrically insulating material, and is integrally secured to the lower portion of the drive sleeve 166c of the tape take-up shaft 166. The transmission spring 166d is thus interposed between the support ring 150 and the drive wheel 166b, and a drive which is externally applied to the drive wheel 166b acts through the spring 166d and the support ring 150 to rotate the drive sleeve 166c. The tension springs 165d, 166d form a slip mechanism permitting a slip of the drive sleeve 166c, for example, preventing an increase in the tape speed as the tape continues to be taken up to thereby increase the diameter of the roll on the tape take-up hub. When the tape reaches its terminal end and the drive sleeve 166c ceases to rotate even though a drive continues to be applied to the drive wheel 166b, the spring 166d permits the drive wheel 166b to slip, preventing the transmission of the drive to the drive sleeve 166c. In this manner, the springs 165d, 166d form friction gearings.

The contact segments 146 to 148 are embedded in the outer periphery of the support ring 150 at an equal spacing for engagement by the tips of the conductive contact fingers 143 to 145. Each of the fingers 143 to 145 comprises a resilient conductive wire material, and has a base end secured to an electrically insulating holder 168 through which it is connected with the junctions T2a, T2b and T2c (see FIG. 9), respectively. Each of the contact segments 146 to 148 may comprise a metal foil, for example, having a circumferential length which is sufficient to permit a pair of adjacent contact fingers to engage with one of the contact segments simultaneously, but which is insufficient to permit a simultaneous engagement of all of the three contact fingers 143 to 145 therewith. When the support ring 150 rotates counter-clockwise, the contact segment 147 is initially engaged by the contact finger 145, for example, and then by contact finger 144. At this time, the segment 147 is simultaneously engaged by the contact fingers 145 and 144, and when it is engaged by the contact finger 143, the contact finger 145 is disengaged therefrom, leaving the contact segment 147 engaged by the contact fingers 144 and 143 simultaneously. The same applies to the remaining contact segments 146 and 148.

Returning to FIG. 9, an audio frequency oscillator 170 is connected with the amplifier 101 and the tape end detector circuit 140. The oscillator 170 is formed by a multivibrator oscillator circuit which is similar to the oscillator shown in FIG. 1. Thus, it comprises a pair of transistors 171, 172 which are cross-linked by resistors 173, 174, 175, 176 and capacitors 177, 178. An output of the oscillator 170 which is produced at the collector of the transistor 172 is coupled through a coupling capacitor 180 with the base of the transistor 107 in the amplifier 101. When the oscillator 170 is operative, an output therefrom is fed to the input of the amplifier 101 through the capacitor 180. The resistors 173 to 176 have their one end connected with the collector of the second switching transistor 142 in the tape end detector circuit 140, and are fed from a positive bus 108a when the transistor 142 is conductive.

In operation, when a sufficient length of magnetic tape is remaining on the tape hub 152 which fits over the tape supply shaft 165, the tape is fed at a uniform rate by the cooperation of the capstan and the pinch roller, and is taken up around the periphery of the tape hub 153 which is rotatively driven by the tape take-up shaft 166. When the tape is running, the tape take-up shaft 166 rotates in the counter-clockwise direction, for example, and such rotation is imparted to the drive sleeve 166c and the support ring 150, which therefore also rotate in the counter-clockwise direction, thus causing the contact segments 146, 147, 148 to be engaged by the three resilient slidable contact fingers 145, 144, 143 in a sequential manner. As the contact between the contact segments and the contact fingers occurs, the capacitors C1 and C2 are alternately short-circuited, preventing them from being charged to a given value. Specifically, when the rotation of the support ring 150 has caused the contact segment 147 to be engaged by the contact fingers 144 and 145, the capacitor C1 is short-circuited, whereby the charge thereon is discharged. At this time, the charging of the capacitor C2 takes place through the contact segment 147, but the charge on the capacitor C2 is discharged when the contact segment 147 is engaged by the contact fingers 144 and 143. During the time the charging and discharge take place in an alternate fashion or during the time the tape continues to run, the capacitors C1, C2 cannot be charged to a given value, so that an operating voltage of a given value cannot be applied to the base of the first switching transistor 141, which therefore remains non-conductive. When the running tape reaches its terminal end under this condition, the absence of any length of the tape being fed causes the tape hubs 152, 153 to cease their rotation. Thereupon, the slip mechanism formed by the springs 165d, 166d becomes operative to interrupt the rotation of the drive sleeves 165c, 166c and the support ring 150. Since the contact segments 146 to 148 also come to a stop, either capacitor C1 or C2 or both of these capacitors are free to charge up to a given value.

The choice of the particular capacitor or the capacitors which are charged depends on the angular positions assumed by the contact segments 146 to 148 as they come to a stop. Whatever position they may assume as they come to a stop, it is not possible for both capacitors C1, C2 to be short-circuited simultaneously, thus allowing at least one of them to be charged. As the selected capacitor is charged, the voltage thereacross increases to a value which is sufficient to render the transistor 141 conductive. This in turn renders the second switching transistor 142 conductive. As a consequence, the transistor 139 is supplied through the resistor 136 with a bias voltage, which causes this transistor to conduct. Thereupon, the loudspeaker 102 is connected across the transformer secondary coil 121a.

On the other hand, when the second transistor 142 conducts, the oscillator 170 is fed from the bus 108a through the conducting transistor 142, whereby an output signal of an audio frequency is coupled therefrom through the capacitor 180 to the base of the transistor 115 contained in the amplifier 101 of the tape recorder. The signal is amplified by the amplifier 101 and appears across the transformer secondary coil 121a of the output transformer 121, permitting the loudspeaker 102 which is connected thereacross through the conducting transistor 139 to give off an audible alarm indicative of the fact that the running tape Tp has reached its terminal end. While in the embodiment described, the contact segments have been mounted on the tape take-up shaft 66, they may be mounted on the tape supply shaft 65.

In the case when a cassette tape recorder in which the tape end warning apparatus including the tape end detector circuit 140 is incorporated has a pause mechanism, as inconvenience is caused in that the tape end warning apparatus operated in response to the depression of a pause button such an interruption of the tape running results in the interruption of the rotation of the tape hubs 152, 153 (see FIG. 10) concurrently. As is well recognized, the pause mechanism operates by interrupting the energization of a tape drive motor by a pause switch. In other words, the amplifier and other electrical circuits are maintained energized while the energization of only the tape drive motor is interrupted to bring the tape to a stop. This results in stopping the tape take-up and supply shafts and hence the tape hubs which they engage.

Figure 11:
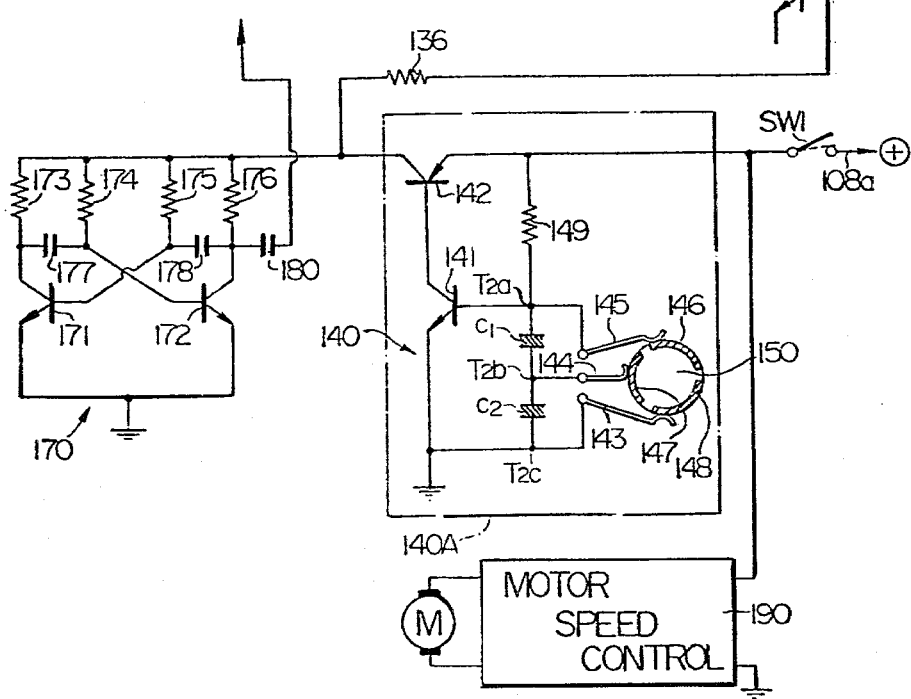
FIG. 11 is a circuit diagram of a modification of the tape end detector shown in FIG. 9 which includes a switch adapted to be operated in ganged relationship with a pause button.

FIG. 11 shows another arrangement of the tape end warning apparatus which avoids the above mentioned inconvenience, by feeding the tape end warning apparatus through a switch which is operated in response to a pause button. Referring to FIG. 11, the circuit arrangement shown is generally similar to that shown in FIG. 9 except that a switch SW1 is connected in the positive bus 108a, the switch being adapted to be operated in response to a pause button, not shown. A tape drive motor M and a motor speed control circuit 190 are connected so as to be fed through the switch SW1. The switch SW1 normally remains closed, so that the motor M and the circuit 190 are energized to permit a tape running and to permit the tape end detector circuit 140 and the oscillator 170 to operate when a terminal end of the running tape is reached, thus allowing the tape end to be warned. However, when the pause button is operated to open the switch SW1, the motor M and the circuit 190 are deenergized, and simultaneously the tape end detector circuit 140 and the oscillator 170 are also deenergized, preventing their operation. In this manner, an audible alarm cannot be produced when the pause button is operated, thus eliminating the above inconvenience.

Figure 12:
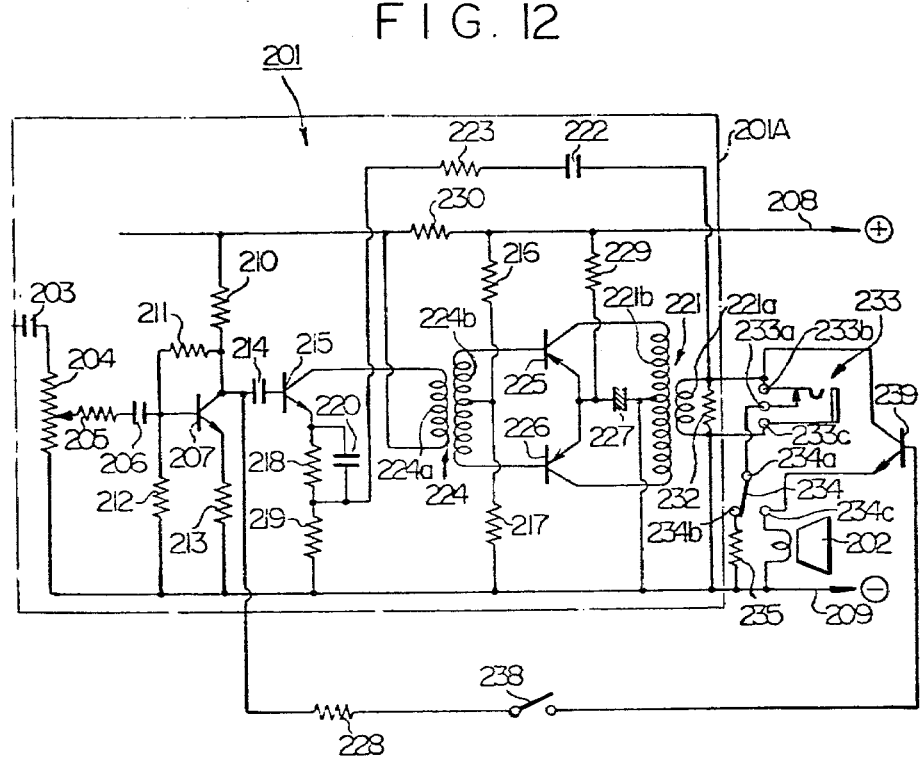
FIG. 12 is a circuit diagram of a tape end warning apparatus constructed according to another embodiment of the invention.

In the embodiment shown, it should be noted that the oscillator 170 may be omitted and instead the collector-base path of the transistor 139 utilized to provide a positive feedback across the amplifier 101 so as to cause an oscillation thereof, thus allowing the loudspeaker 102 to give off an audible alarm. Such an arrangement is shown in FIG. 12. Referring to FIG. 12, an amplifier 201 of a tape recorder is shown in a block 201A shown by phantom lines. The amplifier 201 is operative, during a playback mode of the tape recorder, to amplify an output signal reproduced by a playback head, not shown, and to supply it to a loudspeaker 202, and is also operative, during a record mode of the tape recorder, to amplify an output signal from a microphone, not shown, and to supply it to a record head, not shown. The amplifier 201 is conventional and is generally similar to the circuit arrangement of the amplifier 101 shown in FIG. 9 except for a minor change which will be described later. Therefore, parts or circuit elements shown in FIG. 12 which correspond to those of FIG. 9 are represented by like reference characters added with 100, and the details of the circuit connection will not be described herein. However, the circuit arrangement shown in FIG. 12 differs from that of FIG. 9 in that the base of a transistor 239, which corresponds to the transistor 139, is connected to the junction between the collector of transistor 207 and capacitor 214 (corresponding to elements 107 and 114 shown in FIG. 9) through a series combination of a switch 238 and a resistor 228. The collector of the transistor 239 is connected with the stationary contact 233b of the earphone jack 233 while the emitter is connected with the other stationary contact 234c of the changeover switch 234. The base of the transistor 239 is supplied with an operating voltage for conduction, through the switch 238 as it is closed. The resistor 228 has a resistance which assures a proper operating voltage to the base of the transistor 239, its value being dependent on the resistance of the resistor 210. The resistor 228 may be omitted when the resistor 210 has sufficient value.

The alarm switch 238 is a normally open switch constructed in a manner similar to the switch 38 shown in FIG. 2. Thus, it is disposed in the path of rocking motion of movable member 49 which supports supply shaft 48 for the tape Tp, and is adapted to be closed by the member 49 as a result of an increase in the tape tension as the terminal end of the tape Tp is reached.

In operation, in either the record or playback mode of the tape recorder, the alarm switch 238 is closed when the terminal end of the running tape is reached. When the switch is closed, a forward bias is applied through the resistors 210, 228 and the closed switch 238 to the base of the transistor 239 to render it conductive, whereupon the loudspeaker 202 is connected across the secondary coil 221a and a positive feedback is also applied across the output and the input of the amplifier 201 through a path including the collector-base path of the transistor 239, switch 238 and resistor 228 to drive the amplifier 201 into oscillation. The oscillation output is converted into an audible alarm by the loudspeaker 202, indicating that the terminal end of the running tape Tp has been reached.

Figure 13:
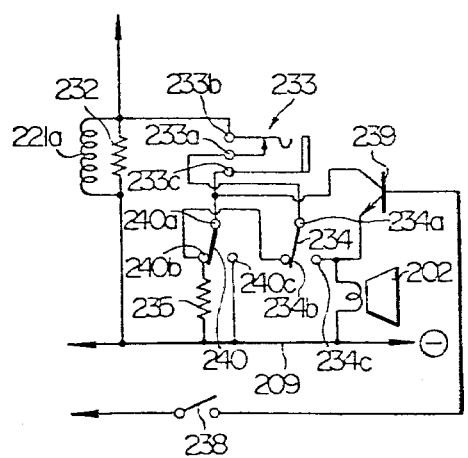
FIG. 13 is a circuit diagram of means which prevents an audible alarm from being given off during a playback operation.

FIG. 13 shows a modification of the circuit arrangement shown in FIG. 12 in which a changeover switch 240 is provided so as to be operated in ganged relationship with the record/playback changeover switch 234 so that an audible alarm indicative of the tape end in only given off during a record mode of the tape recorder. Specifically, the earphone jack 233 has its stationary contact 233b connected with one end of the secondary coil 221a of the output transformer 221 contained in the amplifier 201 (see FIG. 12) of the tape recorder. The other end of the secondary coil 201a is connected with the negative bus 209. The movable contact 233a of the jack 233 is connected with the movable contact 234a of the record/playback changeover switch 234 and is thrown to the stationary contact 234b, during a record mode and thrown to the stationary contact 234c during a playback mode of the tape recorder. The movable contact 233a is normally maintained in contact with the stationary contact 233b. The loudspeaker 202 is connected between the stationary contact 234c of the switch 234 and the bus 209. Instead of being connected with the negative bus 209, the other stationary contact 233c of the jack is connected with the movable contact 240a of a changeover switch 240 having a pair of stationary contacts 240b and 240c, one of the stationary contacts, 240b, being connected through the resistor 235 to the bus 209 and the other stationary contact 240c being directly connected to the bus 209. The stationary contact 234b of the switch 234 is connected with the stationary contact 240b of the switch 240. The transistor 239 has its base connected with one terminal of the switch 238, its collector connected with the stationary contact 233c and its emitter connected with the stationary contact 234c of the changeover switch 234.

In operation, during a record mode of the tape recorder, the record/playback changeover switch 234 assumes a position in which its movable contact is thrown to the stationary contact 234b, and at the same time, the changeover switch 240 assumes a position in which its movable contact is thrown to the stationary contact 240b. When the running tape Tp reaches its terminal end under this condition, an increase in the tape tension causes the switch 238 to be closed in a similar manner similar to that mentioned above. Then a forward bias is applied from the positive bus 208 through the resistors 210, 228 and the closed switch 238 to the base of the transistor 239 to render it conductive. When transistor 239 conducts, the loudspeaker 202 is connected across the secondary coil 201a, and in addition, a positive feedback is established from the secondary coil to the input of the amplifier 201 through a path including the collector-base path of the transistor 239, switch 238 and resistor 228. This causes the amplifier 201 to oscillate, whereby an oscillation output is given off by the loudspeaker 202 as an audible alarm.

In a playback mode of the tape recorder, the record/playback changeover switch 234 has its movable contact thrown to the stationary contact 234c, thus connecting the loudspeaker 202 across the secondary coil 201a. The switch 240, which is ganged with the switch 234, has its movable contact thrown to the stationary contact 240c, thus connecting the stationary contact 233c of the jack 233 with the bus 209. Thus, the closure of the switch 238, which occurs as the tape Tp reaches its terminal end, does not render the transistor 239 conductive, but merely removes the reproduction of sound by the loudspeaker 202, which indicates the end of the tape running.

Figure 14:
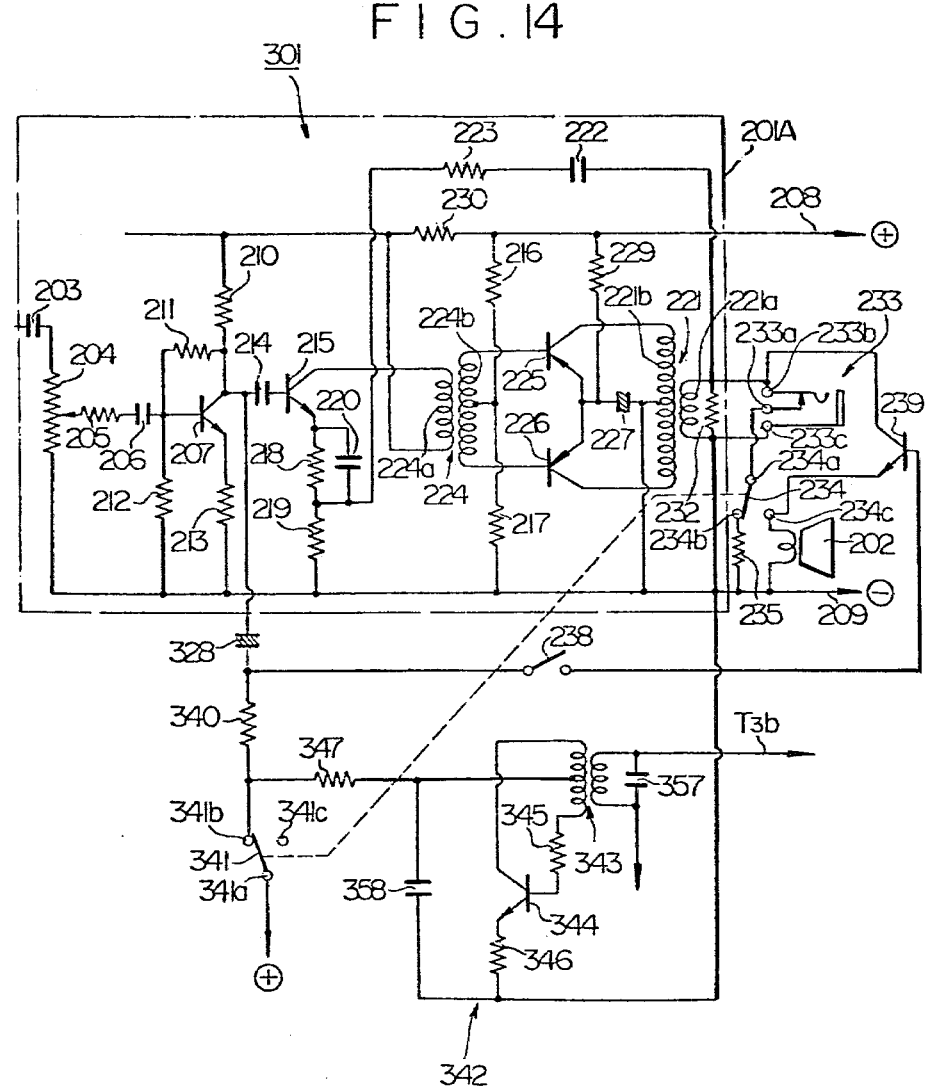
FIG. 14 is a circuit diagram of alternate means for preventing an audible alarm from being given off during a playback operation.

FIG. 14 shows a further circuit arrangement in which a changeover switch ganged with the record/playback changeover switch is provided between the switching transistor 239, and an oscillator which produces a recording bias, thereby enabling the activation of an audible alarm only during a record mode of the tape recorder. Referring to FIG. 14, it will be noted that the circuit arrangement inclusive of an amplifier 301 of the tape recorder as well as the earphone jack 233, changeover switch 234, loudspeaker 202 and switching transistor 239 remains the same as that shown in FIG. 12, and therefore will not be repeatedly described. The only difference over the arrangement of FIG. 12 is found in the substitution of a capacitor 328 for the resistor 228 shown in FIG. 12.

In FIG. 14, the junction between the capacitor 328 and the alarm switch 238 is connected with one end of a resistor 340, the other end of which is connected with a stationary contact 341b of a changeover switch 341 which is ganged with the record/playback changeover switch 234. The switch 341 has a movable contact 341a which is connected with a source of positive voltage and which is thrown to the contact 341b during a record mode of the tape recorder in order to feed power to a bias oscillator 342.

The bias oscillator 342 is of a conventional design, and comprises an oscillation transformer 343, oscillation transistor 344, resistors 345, 346, 347 and capacitors 357, 358. When the changeover switch 341 is in a position to feed the bias oscillator 342, the latter supplies a bias voltage to a record head, not shown, as indicated by an arrow T3b. During a playback mode of the tape recorder, the movable contact 341a is thrown to another stationary contact 341c which is an idle contact, whereby the oscillator 342 is rendered inoperative.

In operation, during a record mode of the tape recorder, the movable contact 341a of the switch 341 is thrown to its stationary contact 341b, whereby power is supplied to the oscillator 342 for applying a bias voltage to the record head, not shown. When the running tape Tp reaches its terminal end, the resulting increase in the tape tension causes the switch 238 to be closed. When the switch 238 is closed, a forward bias is applied through the resistor 340 and the closed switch 238 to the base of the transistor 239 to render it conductive. Thereupon, the loudspeaker 202 is connected across the transformer secondary coil 221a, and simultaneously, a positive feed back is applied across the amplifier 301 through a path including the collector-base path of the transistor 239, switch 238 and capacitor 328. Thus the amplifier 301 is driven into oscillation, and an oscillation output is given off by the loudspeaker 202 as an audible alarm.

During a playback mode of the tape recorder, the movable contact 341a of the switch 341 is thrown to its other stationary contact 341c, so that the bias oscillator 342 remains inoperative. However, the movable contact 234a of the record/playback changeover switch 234 is thrown to the stationary contact 234c, connecting the loudspeaker 202 across the transformer secondary coil 221a. When the terminal end of the running tape is reached, the loudspeaker ceases to reproduce any sound, which signifies to the operator of the end of the tape running. The closure of the alarm switch 238 remains without effect because the movable contact 341a is thrown to the stationary contact 341c, and the resulting non-conduction of the transistor 239 prevents the positive feedback across the amplifier 301 from becoming effective.

It will be noted that the arrangement shown in FIG. 13 which utilizes the changeover switch 240 ganged with the record/playback changeover switch 234 to connect the collector of the transistor 239 with the ground or the negative bus 209 in order to prevent the switching transistor 239 from being rendered conductive during a playback mode, or the arrangement shown in FIG. 14 which utilizes the changeover switch 341 associated with the bias oscillator 342 to render the switching transistor 239 inoperative during a playback mode can equally be applied to the switching transistor 39 in the tape end warning apparatus 1B shown in FIG. 1.

Conversely, the arrangement shown in FIG. 5 which connects the collector of the switching transistor 39 with the movable contact 33a of the earphone jack 33 so that the series combination of the transistor 39 and the loudspeaker 2 may be disconnected from the output transformer 21 when an earphone plug is inserted into the jack to thereby prevent an audible alarm from being produced by the loudspeaker 2 can also be applied to the arrangement shown in FIG. 12 where a positive feedback across the amplifier 201 is utilized to drive it into oscillation. However, it should be noted that when so applied, the non-conduction of the switching transistor 239 results in the interruption of the positive feedback path and hence the failure of the amplifier 201 to oscillate, thus preventing either loudspeaker 202 or earphone from giving off an audible alarm during a secret recording.

Figure 15:
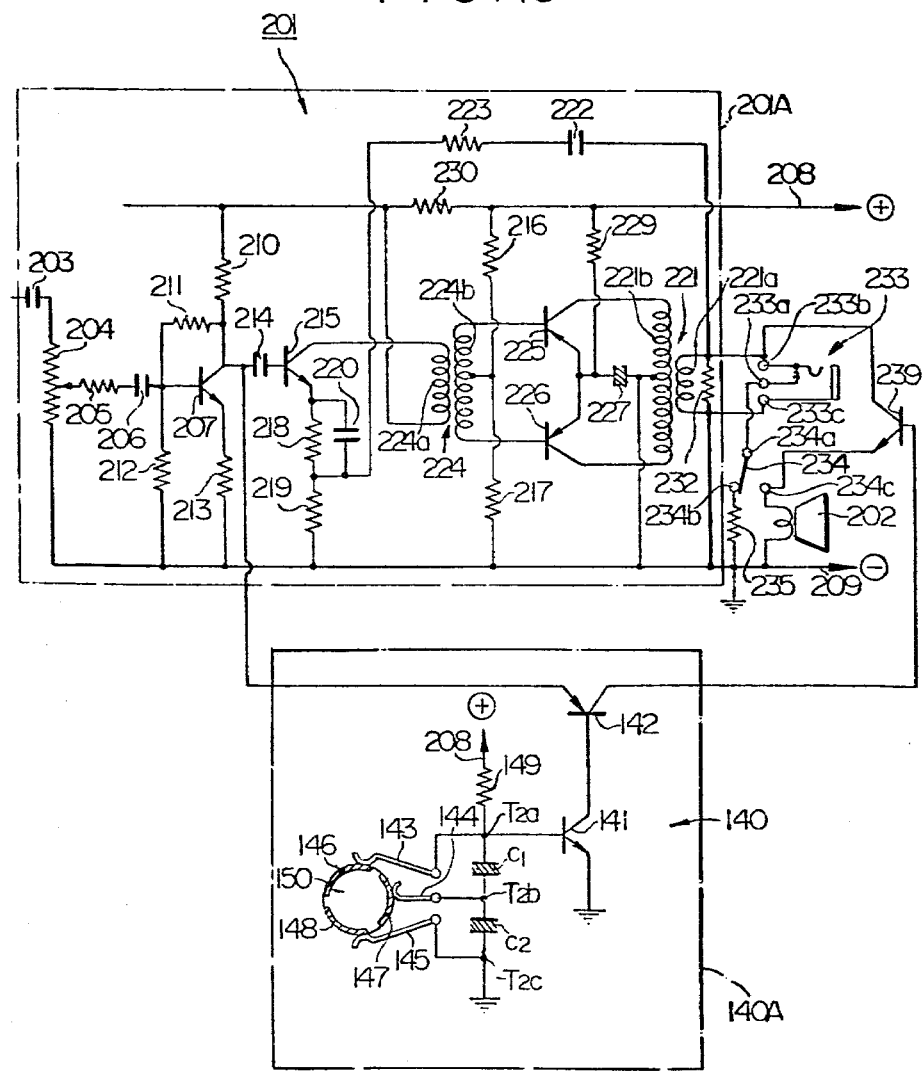
FIG. 15 is a circuit diagram of a tape end warning apparatus according to a further embodiment of the invention which incorporates a tape end detector comprising a capacitor.

Additionally, the arrangement shown in FIGS. 9 to 11 which utilize the pair of capacitors C1 and C2 which are short-circuited by the selective engagement of the contact fingers 143 to 145 with the contact segments 146 to 148 during a tape running but which are allowed to be charged up to produce a tape end detection signal upon interruption of the tape running may also be applied to the self-oscillation circuit shown in FIG. 12 in addition to the circuit arrangement of FIG. 1. A combined circuit arrangement is specifically illustrated in FIG. 15, which however will not be specifically described since the individual circuits have been fully described above.

Furthermore, the use of the diode 56 shown in FIG. 4, the delay circuit 60 shown in FIG. 6 or the means for preventing a howling effect as illustrated in FIGS. 7 and 8 is not limited to the warning apparatus shown in FIG. 1, but may equally be applied to the warning apparatus shown in FIG. 12.

Figure 16:
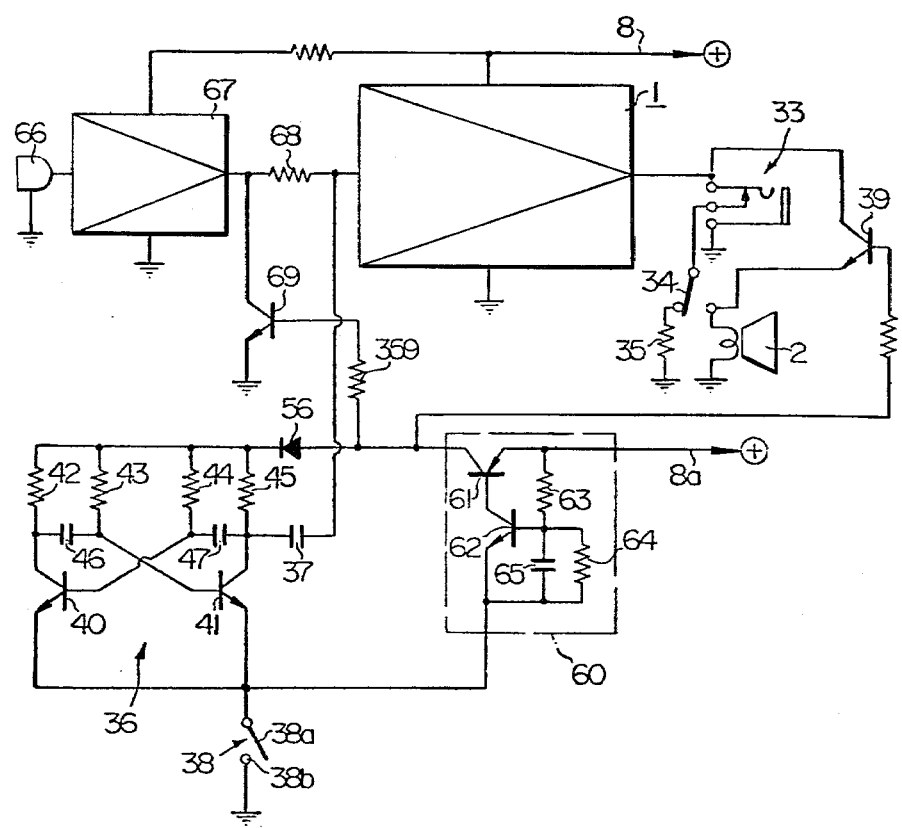
FIG. 16 is a circuit diagram of a combination of circuits shown in FIGS. 6 and 7 which is adapted to be incorporated into a tape recorder.

The means illustrated in FIG. 6 for preventing an alarm due to contact closures which may be caused by vibrations of the tape recorder and the means of FIG. 7 which prevents a howling effect may be used in combination, as shown by a circuit diagram of FIG. 16. In this instance, the resistor 64, capacitor 65 and the emitter of the transistor 62 in the delay circuit 60 are connected in common with the emitters of both transistors 40, 41 in the oscillator 36, and connected with the movable contact 38a of the alarm switch 38, the stationary contact 38b of which is connected with the ground. This permits a convenient part of the casing of the tape recorder to be utilized as the stationary contact 38b for cooperation with an insulated movable contact, thus allowing the switch construction to be simplified. A resistor 359 is shown connected between the base of the transistor 69 and the junction between the anode of the diode 56 and the collector of the transistor 61 to assure a sufficient voltage level is supplied to the oscillator 36.

What is claimed is:

1. A tape end warning apparatus for use in a tape recorder of the type which includes an audio amplifier, a loud speaker, a first switch for connecting an output of said amplifier to said loudspeaker when said tape recorder is in a playback mode and for disconnecting said output of said amplifier to said loudspeaker when said tape recorder is in a record mode, a tape cassette receiving chamber, a drive shaft extending into said receiving chamber and adapted to engage a drive shaft recess in a tape cassette when a tape cassette is placed within said receiving chamber, and drive means for driving said drive shaft, said tape end warning apparatus comprising:

a feedback circuit, including a normally open switch, forming an electrical feedback path between said output and an input of said amplifier when said normally open switch is closed;

an end tape detecting means for closing said normally open switch when an end of tape condition is detected, said end of tape detecting means including:

(1) a lever which is pivotable about a predetermined axis, said lever rotatably supporting said drive shaft at a point spaced from said axis, said lever adapted to pivot when the tension of a tape carried by a cassette placed in said receiving chamber increases due to an end of tape condition; and (2) said lever adapted to close said normally open switch when said lever is rotated due to said end of tape condition whereby said feedback circuit connects the output of said amplifier to the input of said amplifier and said loudspeaker generates an audible alarm signal.

2. The tape end warning apparatus of claim 1, further including means for disabling said feedback circuit when said recorder is operating in said playback mode whereby said audible alarm signal is not generated when said tape recorder is in said playback mode.

3. The tape end warning apparatus of claim 2, wherein said amplifier includes an output transformer, said feedback circuit includes a transistor which is rendered conductive during a record mode when said normally open switch is closed, said transistor forming part of said electrical feedback path between said output and said input of said amplifier and wherein said disabling means electrically connects said output transformer to said transistor when said tape recorder is in said record mode and electrically disconnects said output transformer from said transistor when said tape recorder is in said playback mode.

4. A tape end warning apparatus for use in a tape recorder of the type which includes an audio amplifier and a first switch for connecting an output of said amplifier to said loudspeaker when said tape recorder is in a playback mode and for disconnecting said output of said amplifier to said loudspeaker when said tape recorder is in a record mode, said tape end warning apparatus comprising:

a feedback circuit, including a normally open switch, forming an electrical feedback path between said output and an input of said amplifier when said normally open switch is closed; and an end of tape detecting means for closing said normally open switch when an end of tape condition is detected.

5. The tape end warning apparatus of claim 4, further including means for disabling said feedback circuit when said tape recorder is operating in said playback mode.

6. The tape end warning apparatus of claim 5, wherein said amplifier includes an output transformer, said feedback circuit includes a transistor which is rendered conductive during a record mode when said normally open switch is closed, said transistor forming part of said electrical feedback path between said output and said input of said amplifier and wherein said disabling means electrically connects said output transformer to said transistor when said tape recorder is in said record mode and electrically disconnects said output transformer from said transistor when said tape recorder is in said playback mode.

7. The tape end warning apparatus of claim 1 or 4, further including:

a record bias oscillator for generating a bias voltage which is applied to a magnetic head included in said tape recorder whenever a power supply is applied thereto; and switch means coupled to said first switch for applying said power supply to said record bias oscillator whenever said recorder is in said record mode and for disconnecting said power supply from said oscillator whenever said recorder is in said playback mode.

8. A tape end warning apparatus for use in a tape recorder, comprising an alarm switch adapted to be closed when a running tape reaches its terminal end, and a switching transistor adapted to be forward biased into conduction upon closure of the switch for connecting a loudspeaker across the output of an amplifier contained in the tape recorder and for forming a electrical feedback path across the output and input of the amplifier to drive it into oscillation, thereby enabling an oscillation output to be given off by the loudspeaker as an audible alarm when the running tape reaches its terminal end.

* * * * *